Patented Feb. 26, 1924.

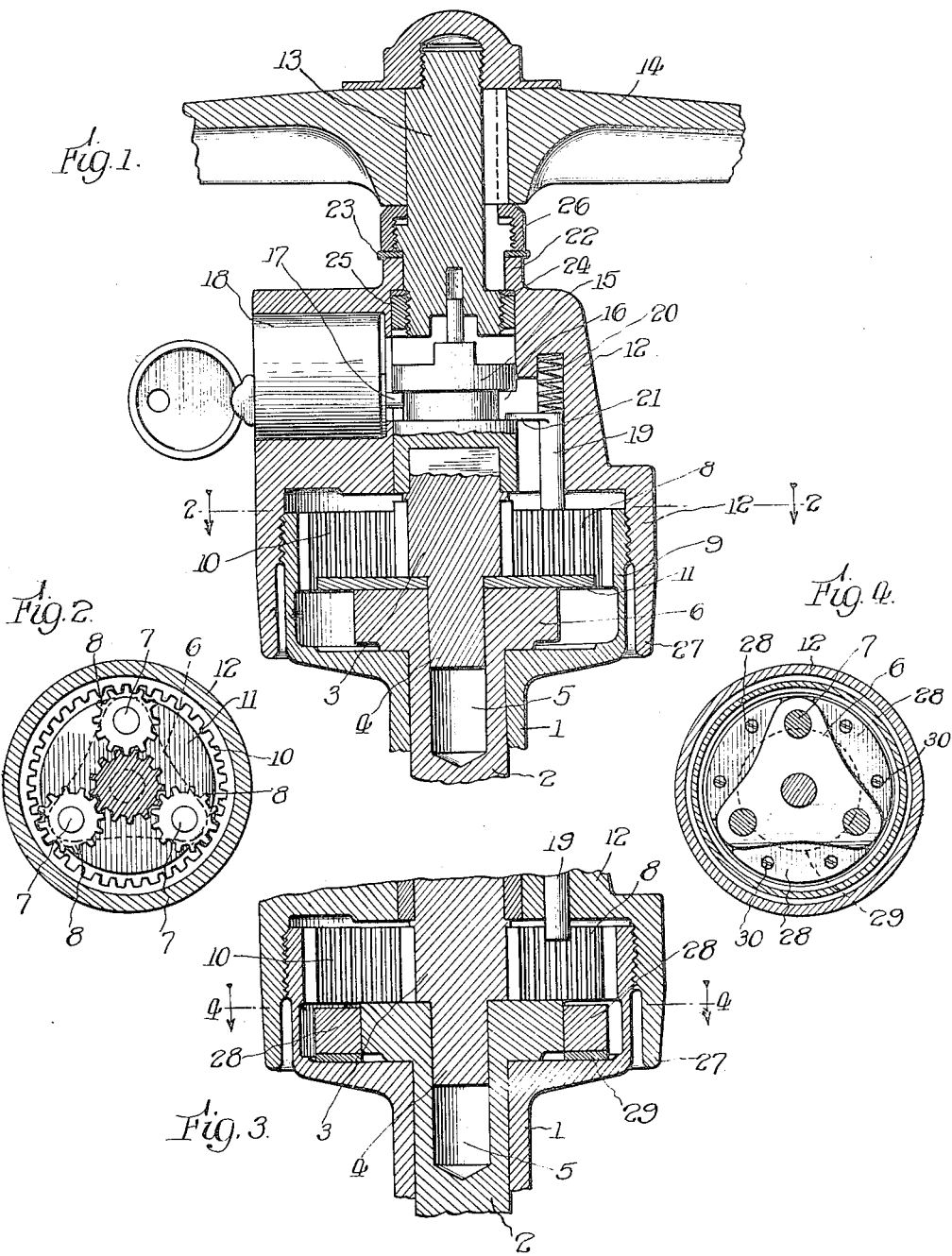

1,484,639

UNITED STATES PATENT OFFICE.

HARRY F. GEORGE, OF CHICAGO, ILLINOIS.

ARMORING MEANS.

Application filed December 15, 1921. Serial No. 522,458.

*To all whom it may concern:*

Be it known that I, HARRY F. GEORGE, a citizen of the United States, residing at Chicago, in the county of Cook and State of Illinois, have invented certain new and useful Improvements in Armoring Means, of which the following is a specification.

The present invention relates to armoring means.

More particularly the present invention relates to means for locking the steering wheel of an automobile and pertains to armoring means whereby said locking means may not be rendered ineffective. Various devices have been made and are being used for the purpose of rendering it impossible to steer an automobile from the steering wheel when it is desired to lock said automobile. In many cases thieves have been able to get away with cars by sawing or filing through certain parts of the steering mechanism, thereby nullifying the effect of said locking means.

An object of the present invention is to provide armoring means which will baffle a thief in an attempt to nullify the effect of the locking means.

A further object is to provide armoring means readily adaptable to cars now in use, particularly those of the Ford type, and which will require only a minimum of skill for installing.

A further object is to provide armoring means for steering wheel locking mechanism in cars of the Ford type which will effectually prevent tampering with the vital parts thereof.

Further objects will appear as the description proceeds.

Referring to the drawings—

Figure 1 is a vertical sectional view illustrating one embodiment of the present invention;

Figure 2 is a sectional view taken along the line 2—2 of Figure 1;

Figure 3 is a vertical sectional view illustrating a modified embodiment;

Figure 4 is a sectional view taken along the line 4—4 of Figure 3.

Referring first to Figures 1 and 2, the numeral 1 indicates the steering column of an automobile, which may be of the Ford type. Mounted within said steering column 1 is the steering post 2 which may be connected at its lower end to the steering mechanism (not shown) of the car. Mounted at the upper end of the steering post 2 is the sun gear 3, which has a cylindrical pin 4 which rides in the cylindrical hole 5 in said steering post 2. Said steering post may be provided with a spider 6, which is illustrated as being of triangular formation, having pins 7—7 adjacent to its corners. Said pins 7—7 extend vertically and form supports for the planetary gears 8—8. The steering column 1 has a cup-shaped member 9 at its upper end which is screw-threaded on its outer surface and which is provided with an internal gear 10 on its inner surface. According to the well known Ford construction, the planetary gears 8—8 mesh with the sun gear 3 and the internal gear 10, whereby rotation of said sun gear may communicate a movement of rotation to said steering post 2. Mounted between the spider 6 and the planetary gears 8—8 is the hardened steel washer 11, which is provided with suitable holes for receiving the pin 4 and the pins 7—7. The functions of the washer 11 will be referred to more in detail hereinafter.

Mounted upon the cup-member 9 and having screw-threaded engagement therewith is the cap 12 which carries the shaft 13 of the steering wheel 14. Operative connection between the pinion 3 and the steering wheel shaft 13 is controlled by means of the reciprocatory coupling member 15. The details of the coupling member need not be recited in detail herein. It will be sufficient to state that said coupling member 15 has tongue and groove connection with the pinion 3 at the lowermost end of said coupling member 15 and has tongue and groove engagement with the shaft 13 at the upper end of said coupling member 15. When said coupling member 15 is in its lowermost position, connection is broken between the shaft 13 and said coupling member 15, whereby there is no operative connection between the steering wheel and the steering post 2. When the coupling member 15 is raised to its uppermost position, however, the tongue and groove connection between said coupling member 15 and the steering wheel shaft 13 is established. The tongue and groove connection between the sun gear and the coupling member 15 is always established. when the coupling member is in raised position, therefore, driving connection is established between the steering wheel 14 and the steering post 2. The coupling member 15 may be provided with a groove 16, within which lies the operating stud 17 of the lock 18. Operation of the lock 18 will result in a raising or lowering of the stud 17, producing a reciprocatory movement of the coupling member 15 in a manner which will be apparent. Mounted in the cap 12 is a reciprocating pin 19, spring-pressed downwardly by means of the spring 20. The pin 19 is provided with a finger 21 lying within the groove 20 of the coupling member 15, whereby operation of said coupling member 15 will cause operation of the pin 19. When said coupling member is moved to its lowermost position—that is, the position which breaks the driving relation between the steering wheel and the steering post, said pin 19 will be moved to a position between the planetary gears 8—8, producing the result that said pin 19 will constitute an abutment preventing the unscrewing of the cap from the cup 9. When said coupling member is moved to its uppermost position the pin 19 will be withdrawn from between the planetary gears 8—8, whereby the cap 12 may be removed very readily.

The steering wheel shaft 13 may be mounted within the shouldered portion 22 of the cap 12. Washers 23 and 24 may be provided for bearing members, said washers being held in place by means of the nuts 25 and 26. The means for mounting the steering wheel shaft within the cap 12 need not be described herein, as such construction forms subject matter of another application of the present applicant, for United States Letters Patent Serial No. 509,625, filed October 22, 1921.

The cap 12 should be provided with a depending skirt 27 enveloping the cup 9. The cap 12, or at least the skirt 27, should be of hardened steel whereby to prevent a thief from sawing or cutting into said cap. The hardened steel skirt 27 will effectually prevent a thief from sawing through the thin metal of the side wall of the cup 9, so that said thief will not be able to get at the gears by removing the steering wheel and slipping off the cap 12.

The hardened steel washer 11 effectually prevents a thief from punching a hole in the lower side of the cup 9 and manipulating the pin 19 whereby to permit removal of the cap 12. Though a hardened steel disc 11 is preferred in this construction, it will be clear that a washer or disc of other material may be used if preferred.

The construction illustrated in Figures 3 and 4 differs in certain particulars from that illustrated in Figures 1 and 2. As illustrated in Figure 4, the triangular spider 11 may have mounted adjacent thereto the three segment members 28. Said segment members 28 may fit within the cup 9 below the gear 10 and may have a movement of revolution about the axis shaft 2, being forced to revolve when the spider 6 revolves. Said segment members may be of hardened steel, if preferred, and may be mounted in any preferred way. According to Figure 3, said segment members are mounted upon the annular disc 29 which lies in the bottom of the cup 9. Said segment members 28 may be fastened to said annular member 9 by means of screws 30 or other holding means.

From the above description it will be clear that the cup member 9 is effectually protected from attack from the side by means of the skirt 27 of the cap 12. If a thief were able to sever the cup 9 along a circumferential line and by that expedient remove the cap 12, he could completely undo the effectiveness of any locking mechanism which controls the steering post above the spider 6. By reason of the present invention, however, such an operation is effectually prevented, whereby a thief is baffled. If said thief attempts to accomplish his work by punching through the bottom of cup 9 for the purpose of manipulating the pin 19, whereby he may unscrew the cap 12 from the cup 9, he will be prevented from doing so by reason of the washer 11 of Figures 1 and 2 and the segment members 28 of Figures 3 and 4.

Though the present invention has been illustrated in connection with a free-wheel type of automobile lock, it will be clear that the invention is not limited thereto. The described embodiments of the present invention have been chosen merely for the purpose of illustration and should not be considered in a limiting sense. Many modifications will occur to those skilled in the art. It is intended in this patent to cover all such modifications that fall within the scope of the invention as defined by the appended claims.

I claim:

1. Steering mechanism comprising a steering column having a cup-shaped member, steering elements within said cup-shaped member, and a cap for said cup-shaped member, locking mechanism located within said cup-shaped member and said cap, said cap including a hardened steel portion completely enveloping the side wall of said cup-shaped member when said locking mechanism is in locking position.

2. Steering mechanism comprising a steering column having a cup-shaped member, a cap for said cup-shaped member, said cap and cup-shaped members being provided with means for rendering said steering mechanism inoperative, said cap being provided with means for preventing the removal thereof from said cup-shaped member, and tool-deflecting means within said cup-shaped member lying in a plane normal to the axis of said steering column for protecting said removal-preventing means from attack.

3. Steering mechanism comprising a steering column having a cup-shaped member, a cap for said cup-shaped member, said cap and cup being provided with means for rendering said steering mechanism inoperative, said cap being provided with means for preventing the removal thereof from said cup-shaped member, and tool-deflecting means within said cup-shaped member lying in a plane normal to the axis of said steering column for protecting said removal-preventing means from attack, said cap member being provided with a hardened steel portion protecting the side wall of said cup-shaped member.

4. In steering mechanism, in combination, a steering post, a steering wheel, and mechanism for governing the operative relation between said post and wheel, encompassing means for said steering post having a cup-shaped member, a cap for said cup-shaped member providing a housing for said mechanism, said cap being formed to completely envelop the side wall of said cup-shaped member, said cap being composed of hardened steel, and hardened steel means for protecting said mechanism from attack from the bottom.

5. In steering mechanism, in combination a steering post, a steering wheel, transmitting mechanism mounted between said post and wheel, said transmitting mechanism comprising planetary gears, means for governing operative relation between said wheel and post, enclosing means for said transmitting mechanism and governing means, means responsive to said governing means for controlling the separability of said enclosing means, and protective means within said encompassing means lying in a plane substantially normal to the axis of said steering mechanism for protecting said responsive means.

6. Steering mechanism comprising a steering column having a cup-shaped portion, a cap having screw-threaded engagement with said cup-shaped portion, transmitting mechanism within said cup-shaped portion, locking means adapted to co-operate with said transmitting mechanism to prevent the removal of said cap, and hardened steel means for preventing attack on said removal-preventing means from the under side of said cup-shaped portion.

7. Steering mechanism comprising a steering column having a cup-shaped portion, a cap having screw-threaded engagement with said cup-shaped portion, transmitting mechanism within said cup-shaped portion, locking means adapted to co-operate with said transmitting mechanism to prevent the removal of said cap, and hardened steel means for preventing attack on said removal-preventing means, said cap being formed to completely envelop said cup-shaped portion to protect same from attack from the side.

8. In combination, the housing for the planetary gearing of an automobile steering gear, a housing cover adapted to fit over and cover said housing on the side thereof, and protecting means, non-removable except when said cover is removed, for protecting said housing from attack from below.

9. In combination, the housing for the planetary gearing of an automobile steering gear, a housing cover adapted to fit over and cover said housing on the side thereof, and protecting means for protecting said housing from attack from below.

10. In combination, the housing for the planetary gearing of an automobile steering gear, a housing cover adapted to fit over, cover and completely envelop the side of said housing, and protecting means adapted to protect said planetary gearing from below.

11. In combination, the housing for the planetary gearing of an automobile steering gear, a housing cover adapted to fit over, cover and completely envelop the side of said housing, and protecting means adapted to protect said planetary gearing from below, said cover and protecting means being made of hardened steel.

Signed at Chicago, Illinois, this 13th day of December, 1921.

HARRY F. GEORGE.